Figure 5:
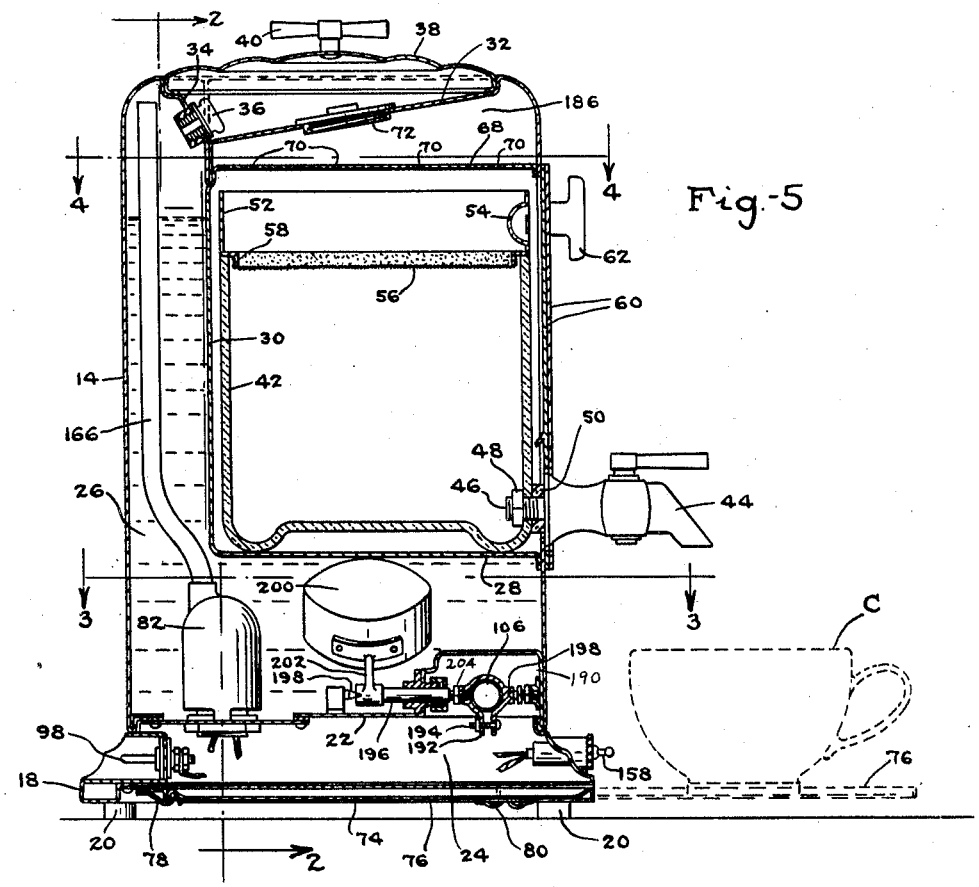

Jan. 19, 1937.  H. D. HARPER  2,067,918
APPARATUS FOR MAKING COFFEE INFUSIONS AND OTHER INFUSIONS
Filed Sept. 10, 1934  3 Sheets-Sheet 1
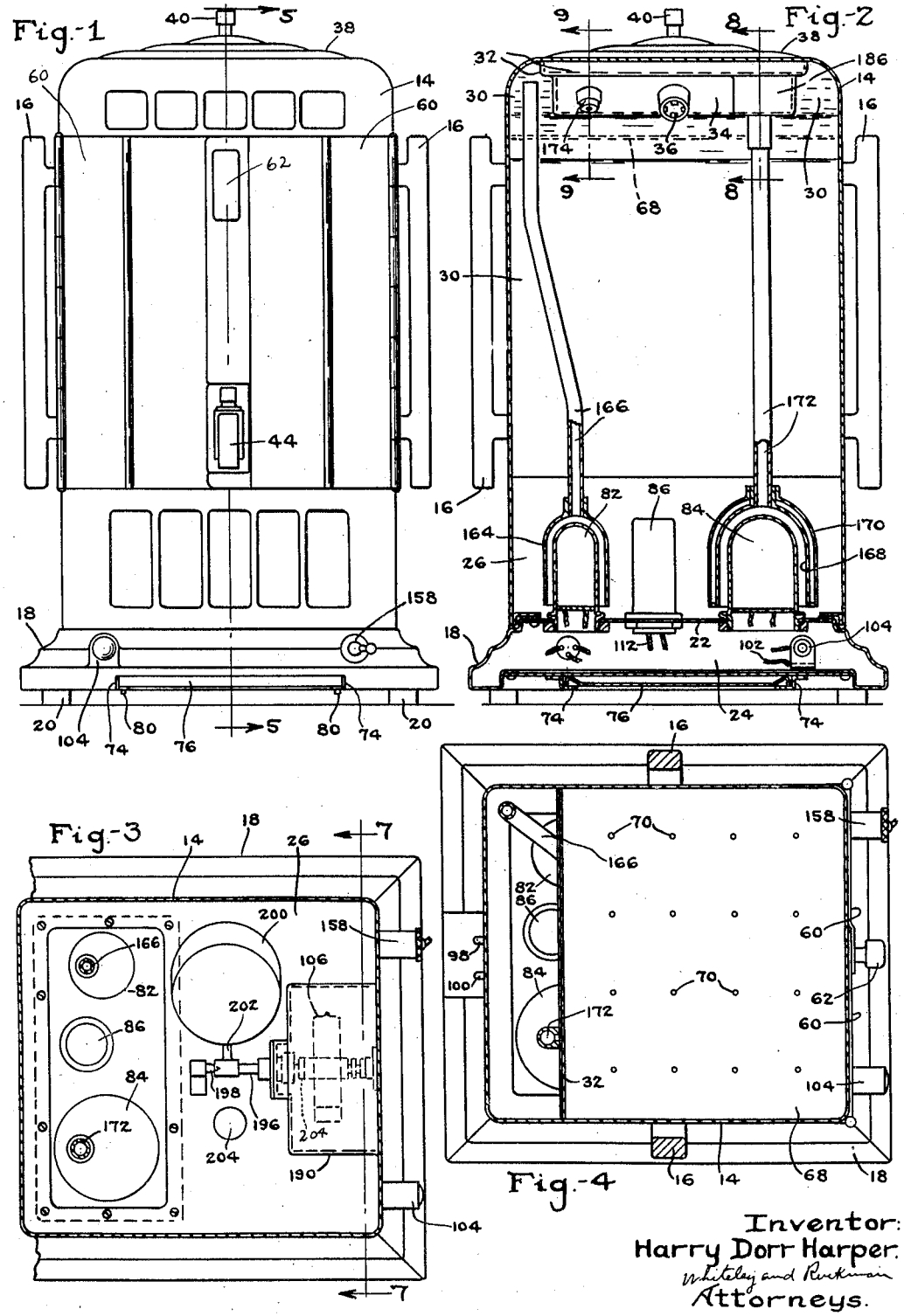
Inventor:
Harry Dorr Harper.
Whiteley and Ruckman
Attorneys.

Inventor:
Harry Dorr Harper.
By Whiteley and Ruckman
Attorneys.

Jan. 19, 1937.  H. D. HARPER  2,067,918
APPARATUS FOR MAKING COFFEE INFUSIONS AND OTHER INFUSIONS
Filed Sept. 10, 1934  3 Sheets-Sheet 3
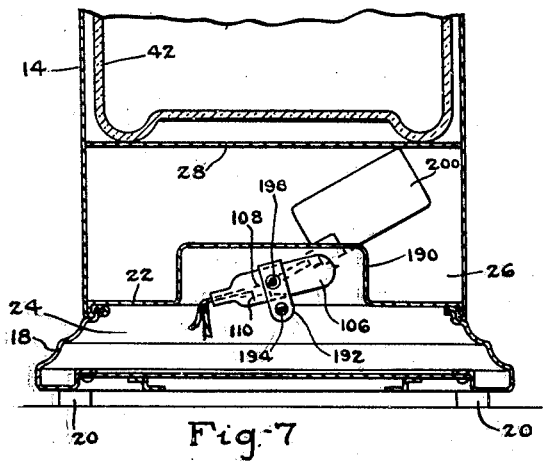
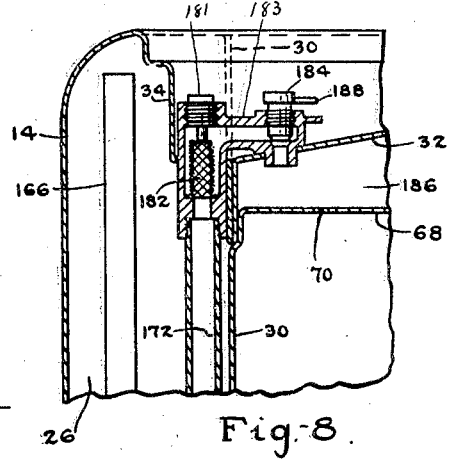
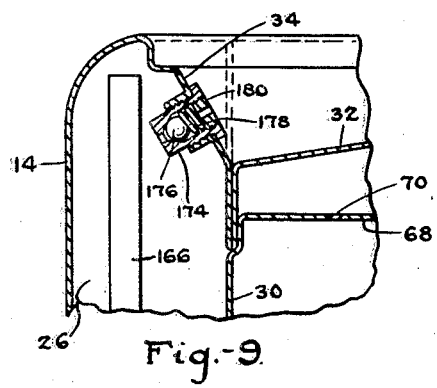
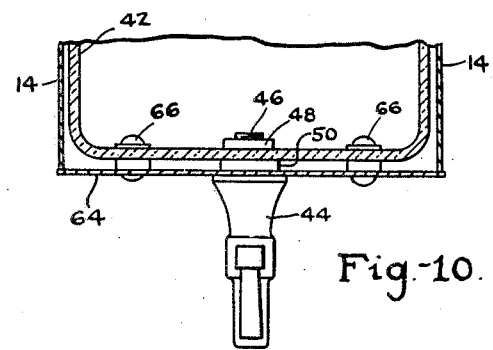
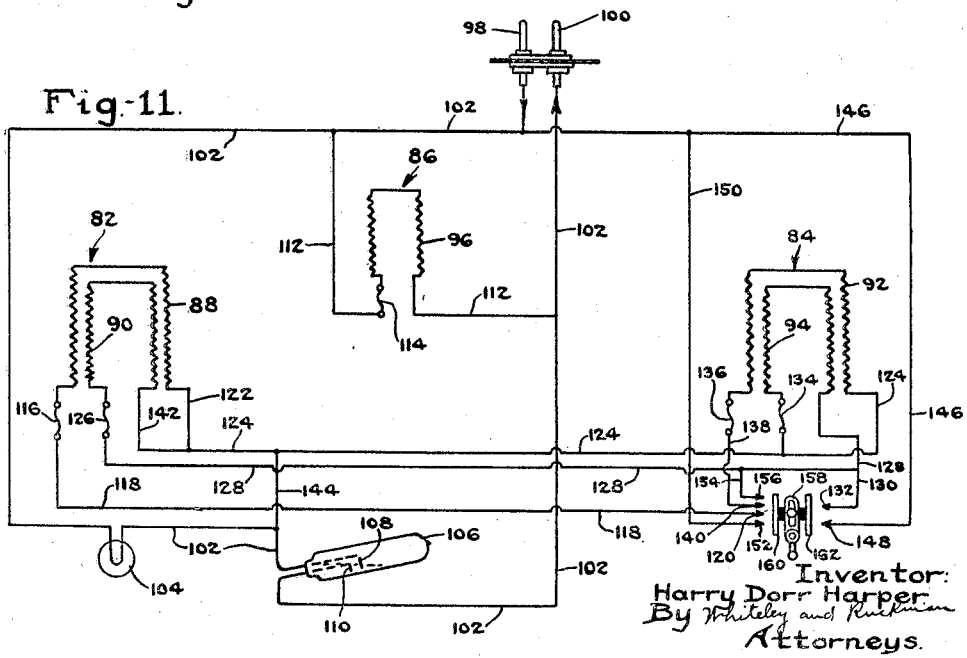
Inventor:
Harry Dorr Harper
By Whiteley and Ruckman
Attorneys.

Patented Jan. 19, 1937

2,067,918

UNITED STATES PATENT OFFICE 2,067,918

APPARATUS FOR MAKING COFFEE INFUSIONS AND OTHER INFUSIONS

Harry Dorr Harper, Minneapolis, Minn., assignor, by mesne assignments, to First National Bank and Trust Company of Minneapolis, Minneapolis, Minn., a national banking association, as trustee for Margaret Kruse Harper Trust Application September 10, 1934, Serial No. 743,427

20 Claims. (Cl. 53—3)

My invention relates to apparatus for making coffee infusions and other infusions. Among the objects of the invention are the provision of apparatus of this character which is of compact arrangement and which is economical in manufacture so that it is particularly adapted for domestic or household use.

Another object of the invention is to provide a receptacle for the material to be infused and means for supplying hot infusing liquid to the material in regulatable predetermined quantities at a regulatable predetermined rate of flow.

Another object is to provide apparatus of this character having a restricted chamber at the upper portion thereof to receive infusing liquid from a storage chamber and means to force the infusing liquid from the storage chamber into the restricted chamber from which it is distributed over the material to be infused placed in a filtration receptacle.

Another object is to provide a heating element for generating steam or vapor from the infusing liquid which produces a pressure for forcing the liquid in the storage chamber past another heating element, and up to the restricted chamber for distribution over the material, the arrangement being such that the liquid flowing past the last mentioned heating element is brought nearly to the boiling point before the steam pressure is built up sufficiently to force the liquid at almost boiling temperature into the restricted chamber. In this connection it may be noted that the weight of the liquid due to its head in the storage chamber assists in forcing the hot liquid up into the restricted chamber, and that the gradual decrease in this head is offset by the building up of additional steam pressure.

Another object is to provide means for automatically cutting off the supply of heat at the time of the final stage of the infusion operation.

While intended more particularly for making coffee infusions, it is to be understood that my apparatus is well adapted for making infusions of other materials, as for instance tea infusions, beef tea extract, and extracts of various herbs used for beverage, medicinal or other purposes. It will also be understood that while I have in mind the use of hot water as the infusing liquid for coffee and tea, other infusing liquids may be used according to the infusion which it is desired to prepare.

Referring more particularly to coffee, among the important points to be observed for making good coffee are, water at the proper temperature, short contact of water with ground coffee, and absence of corroding metals in the receptacle into which the infusion is delivered. Actual boiling imparts a bitter taste to the coffee. But at temperature of water of from 185° F. to 203° F., the caffein is nearly all dissolved, the flavor-giving oils or ethers are not so largely boiled off and certain changes resulting in bitterness and woody taste are absent or practically negligible. Long infusions, even at the lower temperatures increases the bitter taste and decreases the flavor and aroma, while coffee boiled for even one minute is much more bitter than that prepared by infusion at 203° F. Therefore, brief treatment followed by immediate filtration or separation from the ground coffee is desirable. Furthermore, certain metals give an objectionable taste to the coffee infusion while vitrified wares such as glass and porcelain have no deleterious effect on the taste of the infusion.

In view of the foregoing, it will be understood that further objects of my invention are to provide for use of an infusing liquid at the most advantageous temperature, to provide for short contact only of the infusing liquid with the material to be infused, and to provide a receiving bowl for the infusion made of material such as pyrex having no injurious effect on the infusion.

Figure 6:
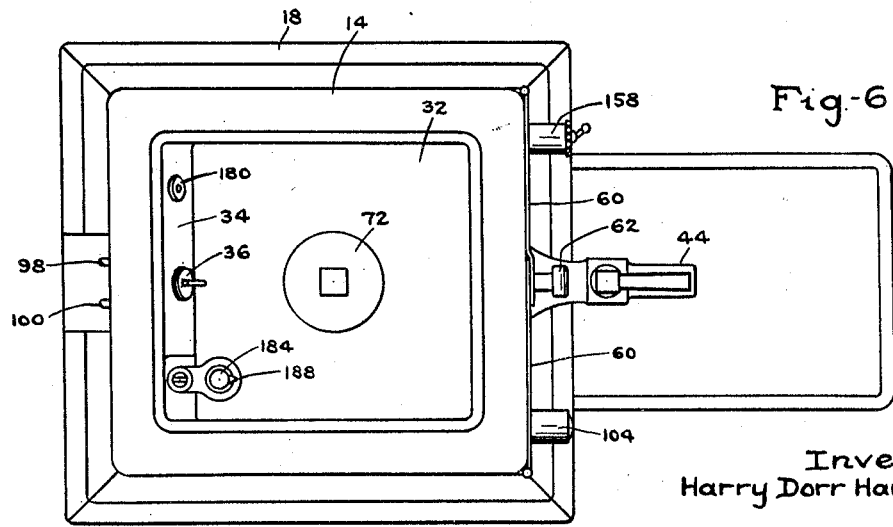

The novel features which I believe to be characteristic of my invention are set forth with particularity in the appended claims. The invention, however, both as to its organization and method of operation, together with additional objects and advantages thereof will be best understood from the following description of specific embodiments when read in connection with the accompanying drawings, in which Fig. 1 is a front elevational view of the apparatus. Fig. 2 is a view in section on the line 2—2 of Fig. 5. Fig. 3 is a view in section on the line 3—3 of Fig. 5. Fig. 4 is a view in section on the line 4—4 of Fig. 5. Fig. 5 (Sheet 2) is a view in section on the line 5—5 of Fig. 1. Fig. 6 is a top plan view, the cover having been removed. Fig. 7 (Sheet 3) is a view in section on the line 7—7 of Fig. 3. Fig. 8 is a view in section on the line 8—8 of Fig. 2. Fig. 9 is a view in section on the line 9—9 of Fig. 2. Fig. 10 is a fragmentary sectional view showing a bowl carrying a panel to serve as a closure. Fig. 11 is a wiring diagram view showing the heating coils.

Referring to the particular construction shown in the drawings for illustrative purposes, it will be seen that I provide a casing 14 to the opposite sides of which handles 16 are attached and which is supported on a base 18 having feet 20 adapted to rest upon any suitable surface. The casing and base may be attached to each other in any suitable manner and the base carries a partition member 22 disposed at the bottom of the casing whereby a chamber 24 is produced in the base.

Above the member 22, the casing contains a chamber 26 for holding an infusing liquid, this chamber being L shaped in vertical section in a direction between the front and rear of the casing as will be understood from Fig. 5. This chamber is L shaped due to the fact that the casing contains an enclosing structure having a bottom 28, a rear wall 30 and a top 32. The member 28 is spaced above the member 22 to provide the lower horizontal portion of the chamber 26 while the member 30 is spaced inwardly from the rear wall of the casing 14 to provide the vertical portion of said chamber. The member 32 as shown in Fig. 5 inclines downwardly from the front of the casing toward the rear thereof and joins with the member 30. The chamber 26 may be nearly filled with infusing liquid in any suitable manner. As shown the wall member 30 extends upwardly and rearwardly to form an inclined member 34 which is provided with an opening adapted to be closed by a screw plug 36. Upon partly unscrewing this plug, the infusing liquid may be readily introduced into the chamber 26. However, the plug may be completely unscrewed for clean out purposes. The top of the casing 14 is completed by a cover 38 provided with a handle 40.

A receiving bowl 42 preferably made of vitreous material such as pyrex rests upon the member 28. The bowl 42 is provided with a faucet 44 secured thereto in liquid tight manner. As shown in Fig. 5, the faucet carries a hollow externally threaded stem 46 passing through an opening near the bottom of the bowl and secured by a nut 48 with a gasket 50 interposed between the exterior of the bowl and the body of the faucet.

A basket or filtration receptacle 52 for holding the material to be infused is adapted to rest upon the bowl 42, the vertical wall of the basket having a re-entrant portion 54 by means of which the basket may be readily lifted. The basket has a bottom 56 formed of fine mesh screen or otherwise provided with perforations. In the form shown in Fig. 5, the lower edge of the basket is rabbetted at 58 to fit inside the top of the bowl 42 whereby the basket and bowl may be handled as a unit if desired. In order that the basket and the bowl may be withdrawn laterally from the casing 14, the front of the latter is provided with doors 60 which may be opened by means of a handle 62, the doors of course being cut sufficiently to move past the faucet 44. Upon opening the doors, it is obvious that the basket when lifted may be removed separately and that if desired the basket and bowl may be removed as a unit without first lifting the basket. Fig. 10 shows a modification in which instead of doors, the closure consists of a plate or panel 64 secured to the front of the bowl by headed members 66.

Above the basket 52, there is a plate or horizontal member 68 containing perforations 70 which are preferably inclined in order that the infusing liquid may be well distributed over the material to be infused which is placed in the basket. Ordinarily, the screen bottom 56 will be of sufficiently fine mesh to prevent undesirable sediment getting through. However, it is obvious that if it is desired to obtain a finer degree of filtration, a filter paper or cloth may be placed in the bottom of the basket in advance of the charge of material which is to be infused. In either case, the basket constitutes a filtration receptacle. Above the plate 68, the member 32 is provided with an opening having a closure 72 which may be removed so that the perforations in the plate may be cleaned.

The base 18 on its underside carries two slideways 74 suitably spaced from each other and which slidably support a tray 76. By referring to Fig. 5, it will be seen that the base 18 carries a stop catch device embodying a resilient finger 78 adapted to snap into engagement with the rear lower edge of the tray and thereby retain the latter in retracted position underneath the base. When some of the infusion in the bowl 42 is to be drawn off, the tray 76 is first pulled out into the dotted line position shown and a suitable receptacle such as a cup C is placed on the tray underneath the faucet. Upon now opening the faucet, the receptacle C may be filled and then removed after the faucet has been closed. The tray therefore serves not only as a support for the receptacle which is to be filled with infusion, but also catches any drip. In order to retain the tray in its extended position, the slideways 74 near their front ends are provided with stop catch devices embodying resilient fingers 80 adapted to engage the lower edge of the tray when the latter is pulled out into the dotted line position of Fig. 5.

A very important feature of my invention includes means for heating the infusing liquid in the chamber 26 and means for causing it to be gradually distributed over the material placed in the filtration receptacle 52. As will be understood from Fig. 2, the partition member 22 constitutes a support for three heating elements secured thereto in liquid tight manner. These three heating elements are designated in general by the numerals 82, 84 and 86 in this figure and also in Fig. 11. Having reference to the particular construction shown in Fig. 11, the heating element 82 includes an outer coil 88 constructed for 200 watts and an inner coil 90 constructed for 250 watts, the heating element 84 includes an outer coil 92 constructed for 300 watts and an inner coil 94 constructed for 450 watts, while the heating element 86 includes a single coil 96 constructed to furnish 50 watts.

The wiring diagram shown in Fig. 11 will now be described in detail. The base carries two terminals 98 and 100 adapted to be connected with any convenient source of electrical energy such as usually installed in households, the terminal 98 being shown for supply and the terminal 100 for return. The terminal 98 is connected by a wire 102 with the terminal 100. The wire 102 includes an indicating light 104 secured to the base as shown in Fig. 1 and a mercury switch 106 having terminals 108 and 110 and which will later be described in detail. The coil 96 is connected across the wire 102 by a wire 112 including a fuse 114. The coil 88 is connected at one end through a fuse 116 with a wire 118 having a terminal 120. The other end of the coil 88 is connected by a wire 122 with a wire 124 which connects one end of the coil 90 with one end of the coil 92. The other end of the coil 90 is connected through a fuse 126 with a wire 128 which is connected to one end of the coil 94. The wire 128 is connected to a wire 130 having a terminal 132. The other end of the coil 94 is connected through a fuse 134 with the wire 124. The second end of the coil 92 is connected through a fuse 136 with a wire 138 having a terminal 140. The second end of the coil 90 is connected by a wire 142 with the wire 124 which in turn is connected by a wire 144 with the wire 102. A wire 146 connects the wire 102 with a terminal 148. The wire 146 is connected by a wire 150 with a terminal 152 while the wire 128 is connected by a wire 154 with a terminal 156. A hand operated switch 158 is attached to the base 18. This switch has a contact member 160 adapted to engage the terminals 152, 120, 140 and 156 when moved to the left from the position shown in Fig. 11. This switch also has a contact member 162 adapted to engage the terminals 132 and 148.

When the apparatus is plugged in, it is obvious that current will be supplied to the heating element 86 regardless of whether the switch 158 is in the open position shown or is in either of its closed positions. Current will pass from the wire 102, through the wire 112, the coil 96, and the wire 112 to the return portion of the wire 102. If the switch is operated to place the contact member 162 in engagement with the terminals 132 and 148, current will flow from the wire 102, through the wire 146, the terminals 148 and 132, the wire 130, the coil 94, the wire 124, the wire 144, the terminals 108 and 110 (assuming the mercury switch 106 to be closed) and through the return portion of the wire 102. At the same time, current will flow from the wire 130, through the wire 128, the coil 90, the wire 142, the wire 124, the wire 144, the terminals 108 and 110 to the return portion of the wire 102. Therefore, low heat is supplied by both the heating elements 84 and 86.

In order to obtain high heat for both of the elements 84 and 86, the switch 158 is operated to bring the contact member 160 into engagement with the terminals 152, 120, 140, and 156. Still assuming the mercury switch 106 to be in closed condition, current will flow from the wire 102 through the wire 150, the terminals 152 and 120, the wire 118, the coil 88, the wire 122, the wire 124, the coil 92, the wire 138, the terminals 140 and 156, and the wire 154 where it divides part going through the wire 128, the coil 94, the wire 124, the wire 144 and switch 106 to the return portion of the wire 102. Also from the wire 154, current flows through the wire 128, the coil 90, the wire 142, the wire 144 and switch 106 to the return portion of the wire 102. At the same time, current passes through the wire 138, the coil 92, the wire 124, the wire 144 and switch 106 to the return portion of the wire 102. With the construction of coils previously specified, it is evident that the heating element 82 will now supply 450 watts and the heating element 84 will supply 750 watts. But with the position of the switch for low heat, the wattage of the element 82 is 250 and that of the element 84 is 450.

The construction associated with the heating elements will now be described. By referring to Fig. 2, it will be seen that the heating element 82 has concentrically spaced around it, a shell 164 open at its bottom and having its upper end connected by a tube 166 with the upper portion of the L-shaped chamber 26 above the infusing liquid therein. The space between the element 82 and its surrounding shell being comparatively narrow, the liquid in this space will be quickly vaporized or converted into steam which will escape through the upper end of the tube 166 and exert pressure on the surface of the liquid in the chamber 26. Still referring to Fig. 2, it will be seen that the heating element 84 has concentrically spaced around it, a shell 168 which is open at the bottom, the space between the element and its shell being comparatively wide. I also prefer to surround the shell 168 with another concentrically spaced shell 170 to provide an air chamber which acts as insulation and restricts the heat from being conveyed outwardly from the shell 168. The liquid heated within the shell 168 tends to rise in a tube 172. The pressure of the steam above the liquid in the chamber 26 and weight of the liquid therein cause a flow of liquid up the tube 172 by the time that the liquid around the element 84 reaches the boiling point. It should now be noted that the wall member 34 as shown in Fig. 9 contains an opening provided with a valve casing 174 within which is a valve 176 held to its seat by a coiled spring 178 interposed between the valve and a perforated screw plug 180 which may be adjusted to regulate the pressure of the steam as desired. It will be understood that the valve 176 acts as a safety valve and will lift for any adjustment before the pressure of steam becomes excessively great. The tube 172 near its upper end is provided with a screen 182 to stop sediment. Above this screen as shown in Fig. 8, the tube 172 is provided with a screw plug 181 so that the screen 182 may be removed for cleaning. The upper end of the tube 172 has a deflected portion 183 containing an adjustable plug valve 184 which regulatably controls the delivery of hot infusing liquid into a restricted chamber 186 located between the top member 32 and the perforated plate 68. The stem of the plug valve 184 is provided with a pointer 188 to enable the valve to be set according to the character of the material to be infused. For instance with finely ground coffee, the valve should be opened more in order to allow the infusing liquid to run through more quickly.

Means for automatically cutting off the supply of heat at the proper time when the infusion process is nearly completed will now be described. This means includes the mercury switch 106 previously referred to. By referring to Figs. 3 and 5 it will be observed that this switch is placed in a liquid tight compartment 190 and that the switch tube is held in a support 192 by a screw 194. In order to control the operation of the switch 106, its support 192 carries a shaft 196 which passes rotatably through the wall of the compartment 190. The ends of this shaft are held for easy turning movement by center points 198 one of which is adjustably carried by the outer wall of the compartment 190 as shown in Fig. 5. A float 200 is secured by a rod 202 to the end of the shaft 196 in the chamber 26, being mounted in such position relatively to the switch 106 that the latter is tilted into open position when the infusing liquid falls to a predetermined level. In order to regulate the position of opening of this switch, the shaft 196 on one side of the support is threaded thereinto and held in adjusted position by a locknut 204. For instance the switch may be set to open when there is about two cups of infusing liquid left in the chamber 26. This will immediately cut off the current from the heating elements 82 and 84 and will also cause the signal light 104 to be cut off. But the heat which has been stored up will still cause the infusing liquid to be delivered up through the tube 172 until the liquid falls below the bottom of the shell 168 with about one cup of liquid remaining in the chamber 26. As previously explained the opening of the switch 106 will not cut off current from the small heating element 86. This will remain on as long as the device is plugged in and is sufficient to keep the infusion in the bowl 42 hot for a considerable period of time.

The operation and advantages of my invention will be readily understood in connection with the foregoing description and the accompanying drawings. Ground coffee or other material to be infused is placed in the filtration receptacle and the storage chamber 26 is supplied with the infusing liquid care being taken not to run it up above the upper end of the tube 166. The infusing liquid may be introduced in any suitable manner. In the construction illustrated, it is intended that the operator will lift the cover 38, give the screw plug 36 a half turn which will cause it to move out quickly and expose the slotted openings therein. The infusing liquid is then poured upon the inclined member 32 from which it runs freely into the chamber 26, the plug 36 then being screwed tightly. Assuming that the device is plugged in, the rise of the float 200 will quickly close the mercury switch 106 so that the current will be supplied to the heating elements 82 and 84 and also to the signal light 104. The heating element 82 as previously explained is so constructed that steam is generated. Some of the heat supplied by this element passes into the mass of liquid, but the remainder being concentrated upon a small amount of liquid in the shell 164, causes steam or vapor to rise in the tube 166 and exert pressure on the surface of the liquid in the chamber 26. In case the infusing liquid is water, this occurs when the temperature of the water as a whole reaches about 120° F. The pressure of steam plus the weight of the mass of water causes the water to flow past the heating element 84 within the shell 168. The water which is forced past this element is heated additionally so that when it is delivered through the pipe 172 into the restricted chamber 186, it is at the proper temperature for making the infusion.

The chamber 186 holds only a relatively small amount of liquid, the object being that when the liquid comes into this chamber, it more or less evenly distributes itself so that the liquid runs through all of the perforations 70. When the liquid comes up rather rapidly which occurs after it has started to run, the chamber 186 completely fills and because of the pressure exerted on the liquid, it is caused to be dispensed more quickly than it would merely by gravity. It is to be noted that there is no opportunity for steam to escape from the apparatus during the infusion operation unless it might be a small amount around the front closure or doors in case they are not absolutely steam tight. Even if the safety valve under the top cover does blow off to some extent, the steam will not pass out into the room, but will be condensed under the top cover.

At the beginning of the infusion operation, the head of the infusing liquid in the storage chamber is considerable, but as the head decreases, the steam pressure in the storage chamber increases. This is true because the mass of water has been brought to a higher temperature and the heating units are considerably hotter. Therefore, the decrease in the head of the infusing liquid is automatically compensated. When the infusing liquid starts to come over into the restricted chamber, it comes slowly at first and merely drips upon the material in the filtration receptacle, thus wetting it down and putting into better condition to be acted upon by the hot infusing liquid which comes in a continuous stream. In the case of coffee infusions, the period of time during which the infusing water is passing down through the ground coffee usually varies from five to seven minutes. The result is that substantially all of the goodness is extracted from the coffee, and the coffee infusion is of very excellent flavor.

I claim:

1. In apparatus for making coffee infusions and other infusions, the combination of a storage chamber for infusing liquid, means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, and means for heating said stream to infusing temperature as it is being delivered.

2. In apparatus for making coffee infusions and other infusions, the combination of a storage chamber for infusing liquid, means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, means for heating said stream to infusing temperature as it is being delivered, and a regulating device for said delivering means.

3. In apparatus for making coffee infusions and other infusions, the combination of a storage chamber for infusing liquid, means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, means for heating said stream to infusing temperature as it is being delivered, and means for automatically cutting off the heating means at the time of the final stage of the infusing operation.

4. In apparatus for making coffee infusions and other infusions, the combination of a storage chamber for infusing liquid, means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, means for heating said stream to infusing temperature as it is being delivered, and means for regulating said pressure.

5. In apparatus for making coffee infusions and other infusions, the combination of a storage chamber for infusing liquid, electric means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, and electric means for heating said stream to infusing temperature as it is being delivered.

6. In apparatus for making coffee infusions and other infusions, the combination of a storage chamber for infusing liquid, electric means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, electric means for heating said stream to infusing temperature as it is being delivered, and means for automatically cutting off both of said heating means at the time of the final stage of the infusion operation.

7. In apparatus for making coffee infusions and other infusions, the combination of a storage chamber for infusing liquid, means associated with said chamber for supplying heat thereto to produce gaseous pressure on the top surface of the liquid in said chamber, a receptacle for holding the material to be infused, means for delivering the liquid to said receptacle in a stream by utilizing the pressure produced in said storage chamber, means for heating said stream to infusing temperature as it is being delivered, and means separate from said delivering means whereby the infusion is delivered from said receptacle.

8. In apparatus for making coffee infusions and other infusions, the combination of a casing, a restricted chamber in the upper portion of said casing for distributing an infusing liquid, a filtration receptacle for holding the material to be infused and adapted to receive said infusing liquid, a storage chamber for infusing liquid in said casing, a heater for generating steam from the liquid in said storage chamber, a second heater past which the liquid in said storage chamber is caused to flow by the steam pressure, and means for delivering the liquid thus heated into said restricted chamber.

9. In apparatus for making coffee infusions and other infusions, the combination of a casing, a restricted chamber in the upper portion of said casing for distributing an infusing liquid, a filtration receptacle for holding the material to be infused and adapted to receive said infusing liquid, a storage chamber for infusing liquid in said casing, a heater for generating steam from the liquid in said storage chamber, means for regulating the pressure of said steam, a second heater past which the liquid in said storage chamber is caused to flow by the steam pressure, and means for delivering the liquid thus heated into said restricted chamber.

10. In apparatus for making coffee infusions and other infusions, the combination of a casing, a restricted chamber in the upper portion of said casing for distributing an infusing liquid, a filtration receptacle for holding the material to be infused and adapted to receive said infusing liquid, a storage chamber for infusing liquid in said casing, a heater for generating steam from the liquid in said storage chamber, a second heater past which liquid in said storage chamber is caused to flow by the steam pressure, means for delivering the liquid thus heated into said restricted chamber, and a regulating valve for said delivering means.

11. In apparatus for making coffee infusions and other infusions, the combination of a casing, a restricted chamber in the upper portion of said casing for distributing an infusing liquid, a filtration receptacle for holding the material to be infused and adapted to receive said infusing liquid, a storage chamber for infusing liquid in said casing, an electric heater in said chamber for generating steam from the liquid therein, a tube for conducting the steam to the upper portion of said storage chamber, a second electric heater in said storage chamber past which the liquid therein is caused to flow by the steam pressure, and a tube for conducting the liquid thus heated into said restricted chamber.

12. In apparatus for making coffee infusions and other infusions, the combination of a casing, a restricted chamber in the upper portion of said casing for distributing an infusing liquid, an enclosing structure in said casing stopping short of the bottom thereof whereby an L shaped storage chamber for infusing liquid is produced extending along the bottom and side of the enclosing structure, a filtration receptacle in said structure for holding the material to be infused and adapted to receive infusing liquid from said restricted chamber, a bowl in said enclosing structure for receiving the infusion from said filtration receptacle, a heater for generating steam from the liquid in said storage chamber, means for delivering the steam to the upper portion of said storage chamber, a second heater past which the liquid in said storage chamber is caused to flow by the steam pressure, and means for delivering the liquid thus heated into said restricted chamber.

13. In apparatus for making coffee infusions and other infusions, the combination of a casing, a restricted chamber in the upper portion of said casing for distributing an infusing liquid, an enclosing structure in said casing stopping short of the bottom thereof whereby an L shaped storage chamber for infusing liquid is produced extending along the bottom and side of the enclosing structure, a filtration receptacle in said structure for holding the material to be infused and adapted to receive infusing liquid from said restricted chamber, a bowl in said enclosing structure for receiving the infusion from said filtration receptacle, an electric heater in the horizontal portion of said storage chamber for generating steam from the liquid therein, a tube passing up the vertical portion of said storage chamber for conducting the steam to the upper end thereof, a second electric heater in said horizontal portion past which the liquid therein is caused to flow by the steam pressure, and a tube passing up said vertical portion for conducting the liquid thus heated into said restricted chamber.

14. In apparatus for making coffee infusions and other infusions, the combination of a casing, a storage chamber for infusing liquid in said casing, a heater for generating steam from the liquid in said storage chamber, a second heater past which the liquid in said storage chamber is caused to flow by the steam pressure, means for delivering the liquid thus heated to the upper portion of said casing, a filtration receptacle for holding the material to be infused and adapted to receive the delivered infusing liquid, and a container in said casing for receiving the infusion from said receptacle.

15. In apparatus for making coffee infusions and other infusions, the combination of a casing, a storage chamber for infusing liquid in said casing, an electric heater for generating steam from the liquid in said storage chamber, a second electric heater past which the liquid in said storage chamber is caused to flow by the steam pressure, means for delivering the liquid thus heated to the upper portion of said casing, a filtration receptacle for holding the material to be infused and adapted to receive the delivered infusing liquid, and a container in said casing for receiving the infusion from said receptacle.

16. In apparatus for making coffee infusions and other infusions, the combination of a casing, a storage chamber for infusing liquid in said casing, an electric heater in said chamber for generating steam from the liquid therein, a second electric heater in said chamber of greater heating capacity than said first heater and past which the liquid is caused to flow by the steam pressure, means for delivering the liquid thus heated to the upper portion of said casing, a filtration receptacle for holding the material to be infused and adapted to receive the delivered infusing liquid, and a container in said casing for receiving the infusion from said receptacle.

17. In apparatus for making coffee infusions and other infusions, the combination of a casing, a storage chamber for infusing liquid in said casing, a heater for generating steam from the liquid in said storage chamber, a second heater past which the liquid in said storage chamber is caused to flow by the steam pressure, means for delivering the liquid thus heated to the upper portion of said casing, a filtration receptacle for holding the material to be infused and adapted to receive the delivered infusing liquid, a container in said casing for receiving the infusion from said receptacle, and means for automatically cutting off both of said heaters at the time of the final stage of the infusion operation.

18. In apparatus for making coffee infusions and other infusions, the combination of a casing, a storage chamber for infusing liquid in said casing, an electric heater for generating steam from the liquid in said storage chamber, a second electric heater past which the liquid in said storage chamber is caused to flow by the steam pressure, means for delivering the liquid thus heated to the upper portion of said casing, a filtration receptacle for holding the material to be infused and adapted to receive the delivered infusing liquid, a container in said casing for receiving the infusion from said receptacle, and means for automatically cutting off the supply of electricity to said heaters at the time of the final stage of the infusion operation.

19. In apparatus for making coffee infusions and other infusions, the combination of a casing, a storage chamber for infusing liquid in said casing, a heater arranged to convert successive small portions of said liquid into steam, a second heater past which the liquid in said storage chamber is caused to flow by the steam pressure for raising successive small portions of said liquid to a temperature slightly below the boiling point of the liquid, means for delivering the heated liquid to the upper portion of said casing, a filtration receptacle for holding the material to be infused and adapted to receive the delivered infusing liquid, and a container for receiving the infusion from said receptacle.

20. In apparatus for making coffee infusions and other infusions, the combination of a casing, a storage chamber for infusing liquid in said casing, a heater arranged to convert successive small portions of said liquid into steam, a second heater past which the liquid in said storage chamber is caused to flow by the steam pressure for raising successive small portions of said liquid to a temperature slightly below the boiling point of the liquid, means for delivering the heated liquid to the upper portion of said casing, means for regulating the flow of the delivered infusing liquid, a filtration receptacle for holding the material to be infused and adapted to receive the delivered infusing liquid, and a container for receiving the infusion from said receptacle.

HARRY DORR HARPER.